US012737328B2

(12) United States Patent
Sheedy et al.

(10) Patent No.: US 12,737,328 B2
(45) Date of Patent: Sep. 15, 2026

(54) HIGH SPEED DATABASE SCHEMA CHANGE DETECTION

(71) Applicant: SAP IRELAND LIMITED, Dublin (IE)

(72) Inventors: Paul Sheedy, Dublin (IE); Paul O'Connor, Dublin (IE)

(73) Assignee: SAP IRELAND LIMITED, Dublin (IE)

( * ) Notice: Subject to any disclaimer, the term of this patent is extended or adjusted under 35 U.S.C. 154(b) by 0 days.

(21) Appl. No.: 18/349,837

(22) Filed: Jul. 10, 2023

(65) Prior Publication Data

US 2025/0021533 A1 Jan. 16, 2025

(51) Int. Cl.

*G06F 16/21* (2019.01)
*G06F 16/13* (2019.01)
*G06F 16/14* (2019.01)

(52) U.S. Cl.

CPC .......... *G06F 16/213* (2019.01); *G06F 16/137* (2019.01); *G06F 16/152* (2019.01); *G06F 16/214* (2019.01)

(58) Field of Classification Search

CPC .... G06F 16/213; G06F 16/137; G06F 16/152; G06F 16/214

See application file for complete search history.

(56) References Cited

U.S. PATENT DOCUMENTS

| | | | | |
|---|---|---|---|---|
| 7,031,956 | B1 * | 4/2006 | Lee | G06F 16/986 707/E17.118 |
| 7,343,377 | B1 * | 3/2008 | van Opdorp | G06F 16/2365 707/999.102 |
| 7,350,191 | B1 * | 3/2008 | Kompella | G06F 9/44505 707/999.005 |
| 2003/0217027 | A1 * | 11/2003 | Farber | G06F 16/1734 |
| 2006/0085465 | A1 * | 4/2006 | Nori | G06F 16/213 |
| 2009/0171720 | A1 * | 7/2009 | Crook | G06Q 40/02 705/35 |
| 2010/0332526 | A1 * | 12/2010 | Nori | G06F 16/213 707/769 |
| 2016/0012153 | A1 * | 1/2016 | Gralnick | G06F 16/9024 707/743 |
| 2017/0147311 | A1 * | 5/2017 | Bregler | G06F 8/30 |
| 2019/0057122 | A1 * | 2/2019 | Kapulovskaya | G06F 16/2272 |
| 2019/0188006 | A1 * | 6/2019 | Ritter | G06F 9/541 |
| 2019/0205429 | A1 * | 7/2019 | Lee | G06F 16/214 |
| 2019/0318117 | A1 * | 10/2019 | Beecham | G06F 16/9024 |

(Continued)

FOREIGN PATENT DOCUMENTS

| | | | | |
|---|---|---|---|---|
| CA | 2437008 A1 * | 2/2005 | | G06F 17/22 |
| WO | WO-2021183111 A1 * | 9/2021 | | |
| WO | WO-2022205544 A1 * | 10/2022 | | G06F 16/137 |

*Primary Examiner* — Dennis Truong

(74) *Attorney, Agent, or Firm* — Fountainhead Law Group, PC

(57) ABSTRACT

Embodiments describe a technique for database schema migration that minimizes queries to the runtime database. A technique is described for detecting whether design time metadata has changed during a schema migration without performing a database query for runtime metadata and comparing the design time metadata with the runtime metadata. The technique may improve performance since it aims at minimizing the number of times the database is queried for runtime metadata during the schema migration.

20 Claims, 7 Drawing Sheets

(56) References Cited

U.S. PATENT DOCUMENTS

| | | | | |
|---|---|---|---|---|
| 2020/0065136 | A1* | 2/2020 | Singh | G06F 16/211 |
| 2021/0405997 | A1* | 12/2021 | Delchev | G06F 8/65 |
| 2022/0215386 | A1* | 7/2022 | Yonekura | H04L 9/50 |
| 2023/0014239 | A1* | 1/2023 | Tekkam | G06F 16/86 |
| 2023/0129469 | A1* | 4/2023 | Ding | G06F 11/1448 707/610 |
| 2024/0028581 | A1* | 1/2024 | Yam | G06F 16/213 |
| 2024/0354290 | A1* | 10/2024 | Scott, Jr. | G06F 16/213 |

* cited by examiner

```
namespace sap.fpa.services.bo;
@Schema: 'SAP_FPA_SERVICES'
context Sample {
    @Catalog.tableType:#COLUMN
    entity  CUBE_INFO {
        key ID: String(255);
        CONTENT: LargeString;
    };
        @Catalog.tableType:#COLUMN
    entity  BASIC_EPM_OBJECT {
        key ID: String(255);
        CONTENT: LargeString;
    };
    @Catalog.tableType:#COLUMN
    entity  CONTENT_EPM_OBJECT {
        key ID: String(255);
        CONTENT: LargeString;
    };
};
```

HIGH SPEED DATABASE SCHEMA CHANGE DETECTION

BACKGROUND

Unless otherwise indicated herein, the approaches described in this section are not prior art to the claims in this application and are not admitted to be prior art by inclusion in this section.

A database is an organized collection of structured data stored in a computer system. The structured data may in turn be utilized by a software application. A database schema defines how the data is organized within the database. Sometimes, a developer may modify the database schema to change existing data structures or to introduce new data structures. When a developer introduces changes to the database schema, a database schema migration occurs. Database schema migrations can be computationally expensive as design time and runtime need to be synchronized.

DETAILED DESCRIPTION

Described herein are methods and apparatuses to quickly detect database schema changes during a database schema migration. Database objects can be described in an abstract way by using design time (DT) metadata to create database objects. Exemplary database objects include tables, sequences, views, etc. Describing database objects with DT metadata can have advantages such as the ability to perform database schema migration without the need to write SQL migration scripts. However to maintain synchronization during database schema migration, the DT metadata is compared with the runtime (RT) metadata to ensure that the runtime objects match their design time specification. Comparing DT metadata with RT metadata may be slow and computationally expensive because to compare the DT metadata with RT metadata, a database query must be performed to retrieve the RT metadata and database queries are a computationally expensive operation. Thus, it is desirable for solutions that minimize database queries during the database schema migration. In some embodiments, a technique is described for quickly detecting whether DT metadata has changed without performing a database query for RT metadata and comparing the DT metadata with the RT metadata. This technique may improve performance since it aims at minimizing the number of times the database is queried for RT metadata during a schema migration. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1A:
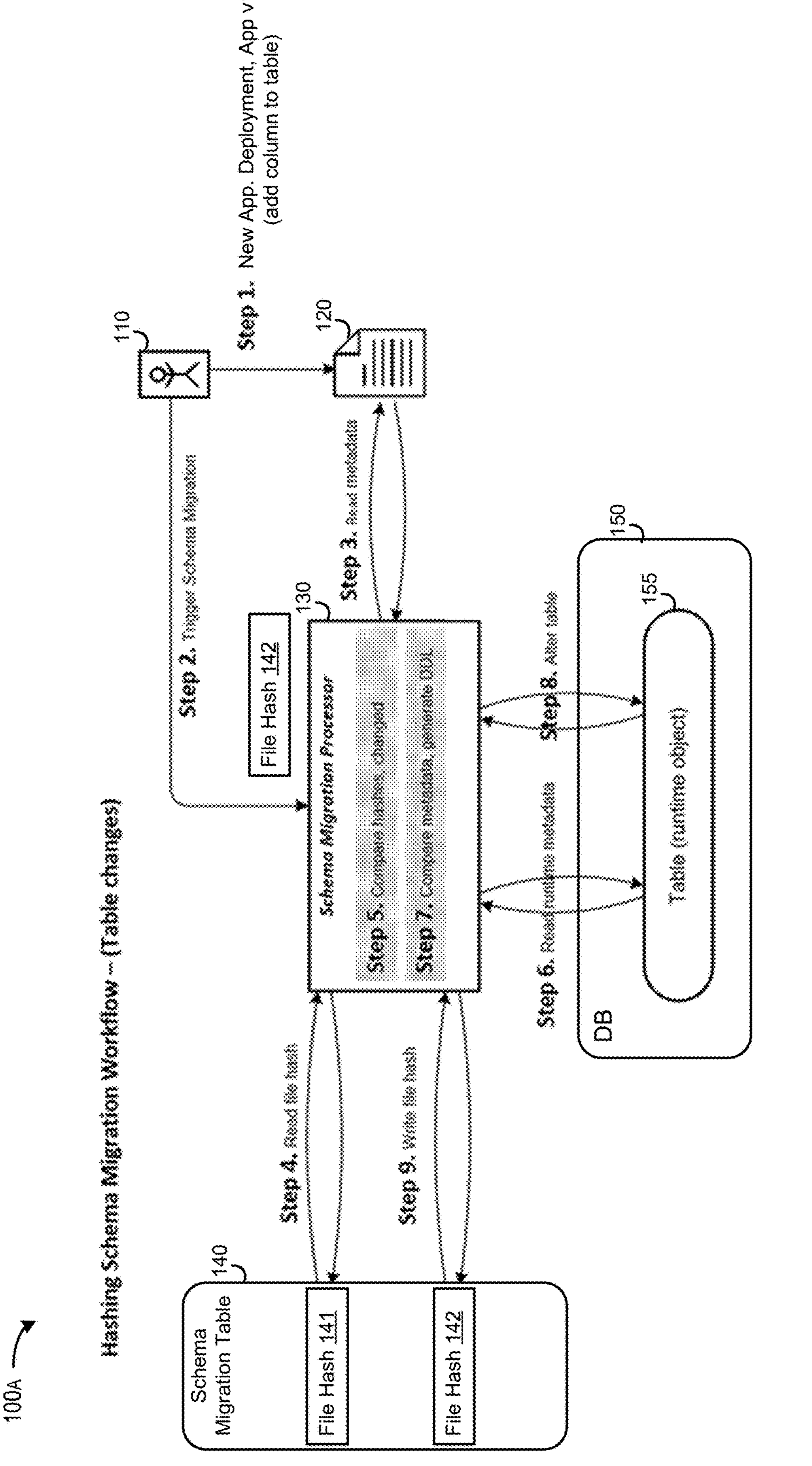
FIG. 1*a* illustrates a workflow for database schema migration according to some embodiments.

FIG. 1*a* illustrates a workflow for database schema migration according to some embodiments. Workflow 100A illustrates a database schema migration where a version 1 of an application is being deployed and a database object in the application has been modified in the design time environment. The modification to the database object may be represented within DB file 120. In one embodiment, DB file 120 can store DT metadata which specifies a single database object. In other embodiments, DT metadata may specify multiple database objects. Here, developer 110 has modified a database table in the design time environment with the addition of new column in version 1 of the application. Workflow 100A can propagate the changes from design time to runtime.

Workflow 100A includes developer 110, DB file 120, schema migration processor 130, schema migration table 140, and database 150. Database 150 stores the runtime environment, including runtime object 155 which corresponds to the database table that has been modified. While the schema migration table 140 is shown here as a separate entity than database 150, in some embodiments schema migration table 140 and database 150 may share the same physical database. At step 1, developer 110 may edit DT metadata 120 to modify the database object. Here, the database object is a table and developer 110 has added a column to a table in the application. At step 2, developer 110 may trigger a schema migration to the schema migration processor 130. Schema migration processor 130 may be a part of the application or a separate entity from the application.

Schema migration processor 130 may be configured to synchronize the DT metadata with the RT metadata. It may do so by migrating database schema changes made by the developer in the design time environment that are represented in the DT metadata over to their respective runtime objects. This way, the runtime objects would match the updated design time specification, ensuring operability in the application during runtime. At step 3, schema migration processor 130 may read DT metadata from DB file 120. Reading DT metadata can include the steps of the schema migration processor 130 requesting the DT metadata and receiving the DT metadata. The DB file 120 may be stored as part of the application in the application's own file system. In one embodiment, the application is running on Node JS and it is possible to read the DB file from that environment.

At step 4, schema migration processor 130 may read file hash 141 from schema migration table 140. In some embodiments, multiple file hashes can be read at once from schema migration table 140 for efficiency. This may be advantageous when multiple file hash comparisons for multiple DT files are going to be performed. Reading file hash 141 can include the schema migration processor requesting the file hash 141 from the schema migration table 140 and receiving the file hash 141. In one embodiment, file hash 141 may be the most recent file hash stored in schema migration table 140 that is associated with DT metadata that was read in step 3. Schema migration table 140 may be configured to store file hashes generated by schema migration processor 130. Changes to DT metadata over time may be captured through file hashes stored in schema migration table 140, where each change corresponds to a file hash. In one embodiment, schema migration table 140 may store a collection of file hashes for each DT metadata in the database. Here, file hash 141 is the most recently generated file hash stored within schema migration table 140 that is associated with DT metadata. File hash 141 may have previously been generated by schema migration processor 130 during a previous iteration when schema migration was triggered or when the runtime object was initially created. In one embodiment, schema migration table 140 may store for each file hash, one or more of the following: the file path for identifying where DT metadata is stored, the file hash value, the version number, and the time that the last update took place.

At step 5, schema migration processor 130 compares the hashes. Comparing the hashes can include generating file hash 142 which is based on DT metadata read from DB file 120. In one example, file hash 142 is wholly derived from the content of the DT metadata. In one embodiment, schema migration processor may apply a hash algorithm such as MD5, SHA-1, SHA-3, SHA-256, SHA-512, or Whirlpool on DT metadata to generate file hash 142.

In one example, schema migration processor 130 may automatically select a hashing algorithm to apply based on the developer's desired speed and security. For instance, a more secure hashing algorithm may be more computation intensive and thus require more time to execute. In other examples, a hashing algorithm may be preselected. Once file hash 142 has been generated, schema migration processor 130 can compare file hash 141 and file hash 142. If the file hashes are the same (or equal or match), then no change has occurred in DT metadata since the last schema migration. Thus, schema migration processor 130 can conclude that the database object associated with DT metadata 120 is unchanged since the last schema migration. However, if the file hashes are different, then a change has occurred in DT metadata since the last schema migration. Here, the file hashes are different and therefore it is determined that a change has occurred in DT metadata. It is noted that once an algorithm is selected, schema migration processor 130 should utilize the same hash algorithm for all future schema migrations so that the file hashes previously generated are still relevant. Any changes to the hash algorithm will result in discarding old hashes or regenerating new hashes which would be expensive.

After schema migration processor 130 determines that a change has occurred, schema migration processor 130 may synchronize the runtime objects with the current state of DT metadata. At step 6, schema migration processor 130 reads runtime metadata from database 150. Reading runtime metadata can include the steps of querying or requesting the runtime metadata from database 150 and receiving the runtime metadata. The process of querying database 150 for RT metadata may be computationally expensive because reading RT metadata is available by making joins across different system views. This can be time intensive.

After the RT metadata has been retrieved, schema migration processor 130 can compare the DT metadata and the RT metadata at step 7. Based on the comparison, schema migration processor 130 may generate a statement to alter or modify the RT metadata so that the RT metadata is in synchronization with DT metadata 120 at step 7. In some embodiments, the DT metadata may be ground truth so therefore the RT metadata is modified to match the DT metadata. In one embodiment, the statement may be a data definition language (DDL) statement. At step 8, schema migration processor 130 can alter the runtime object 155 by executing the DDL statement. Here, schema migration processor 130 may alter the runtime object of the table that has been modified by adding a column to the runtime object. Since there was a change when comparing the file hashes, schema migration processor 130 may write file hash 142 to schema migration table 140 at step 9. In one example, file hash 142 may be stored in a collection with file hash 141 since they are both associated with DT metadata. File hash 142 may represent the most recent version or the current state of DT metadata. After step 9, schema migration processor 130 may repeat steps 3-9 for other DB files in the application.

Figure 1B:
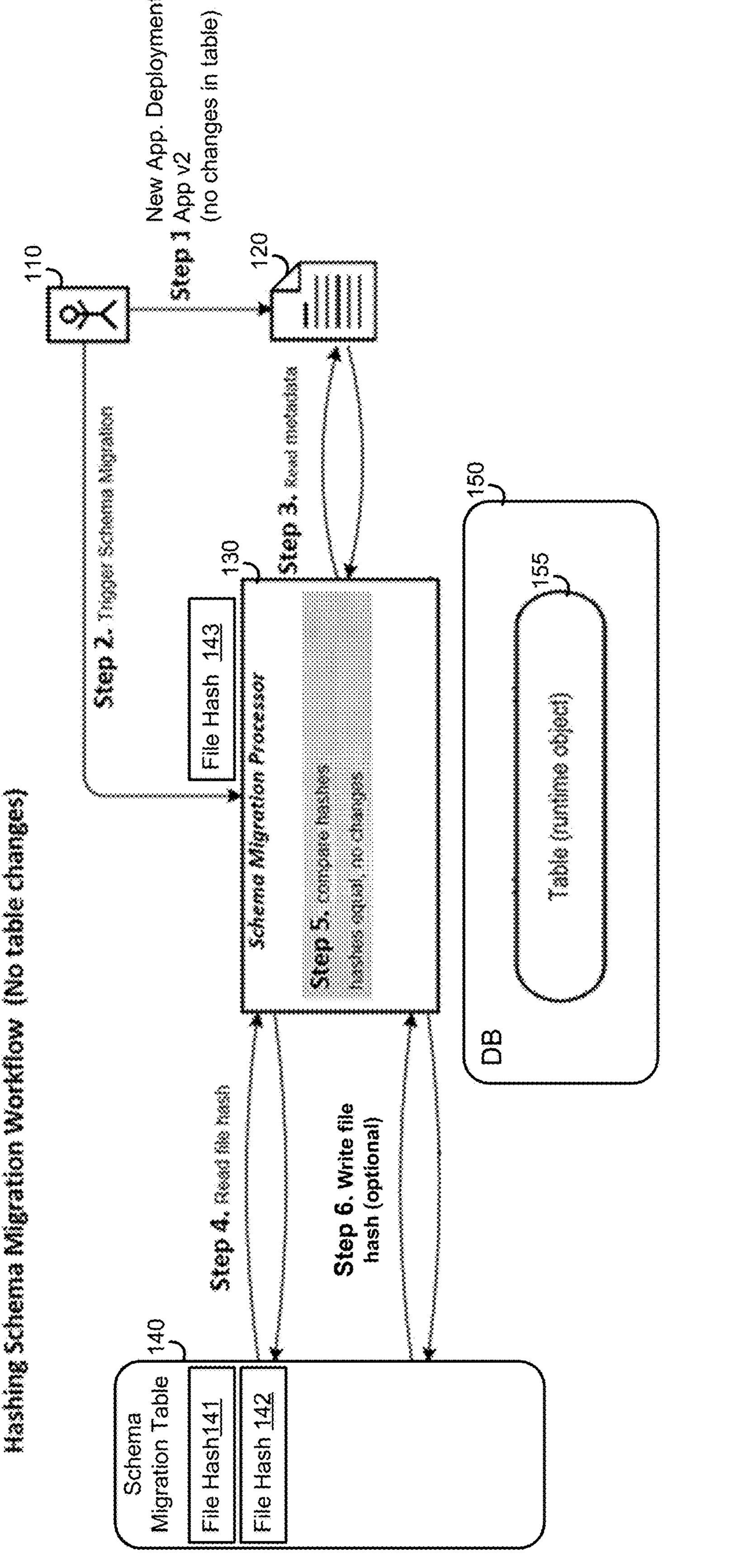
FIG. 1*b* illustrates another workflow for database schema migration according to some embodiments.

FIG. 1*b* illustrates another workflow for database schema migration according to some embodiments. Workflow 100B illustrates a schema migration where DT metadata has not changed since the last schema migration. For example, the last schema migration could be shown in workflow 100A of FIG. 1*a* which resulted in an update to the table and the writing of file hash 142 in schema migration table 140. Here in step 1, the developer is deploying a new application, application version 2. In this update, there are no changes to the table. Thus, DT metadata will remain the same from version 1 to version 2 of the application. Other DT metadata in the application may have changed however in this version.

Developer 110 may trigger schema migration at step 2 by providing an instruction to schema migration processor 130 to begin schema migration. At step 3, schema migration processor 130 may read DT metadata from DB file 120.

Workflow 100B may then continue by reading the latest file hash associated with DT metadata from schema migration table 140 at step 4. Here, the latest file hash associated with DT metadata that is stored in schema migration table 140 is file hash 142, which was generated and stored during the schema migration of version 1 of the application. After reading file hash 142, schema migration processor 130 may compare hashes by first generating file hash 143 from DT metadata. Since DT metadata 120 has not changed from version 1 to version 2 of the application, file hash 143 will be the same as the last time schema migration processor 130 generated a file hash for DT metadata. Schema migration processor can compare file hash 142 and newly generated has file 143 that is associated with the current state of DB metadata. Since there have been no changes to DB metadata, file hash 142 and file hash 143 are equal. Given that the hashes are equal, schema migration processor 130 may determine that no changes have been made to the database object or database objects associated with DT metadata at step 5. Since the database object is unchanged, schema migration processor 130 may move on and process other database objects in the database. As shown in FIG. 1*b*, schema migration processor 130 may conclude processing of DB file 120 without having to query database 150 for RT metadata as in step 6 of FIG. 1*a*. This may result in a performance improvement and speed up the schema migration since querying database 150 is computationally expensive and slow. File hashes allow for rapid change detection at a lower cost when compared to database queries. Here, database queries are only performed when a change is detected, and a change is detected when the file hashes are not equal during the comparison. In some cases, application schemas do not change much between versions. For instance, as little as 1% of the application schema may change between versions so a large percentage of the database objects are unchanged and can skip the database query.

Schema migration processor 130 may not update schema migration table 140 when there are no changes to DT metadata 120 since the latest schema migration. This may be the least computationally expensive option. However in some embodiments, schema migration processor 130 may update data in schema migration table 140 at optional step 6. For example, schema migration processor may update the latest file hash associated with DT metadata in schema migration table 140 by updating parameters stored along with the file hash. Parameters such as the last update time or the version number may be updated.

Figure 2:
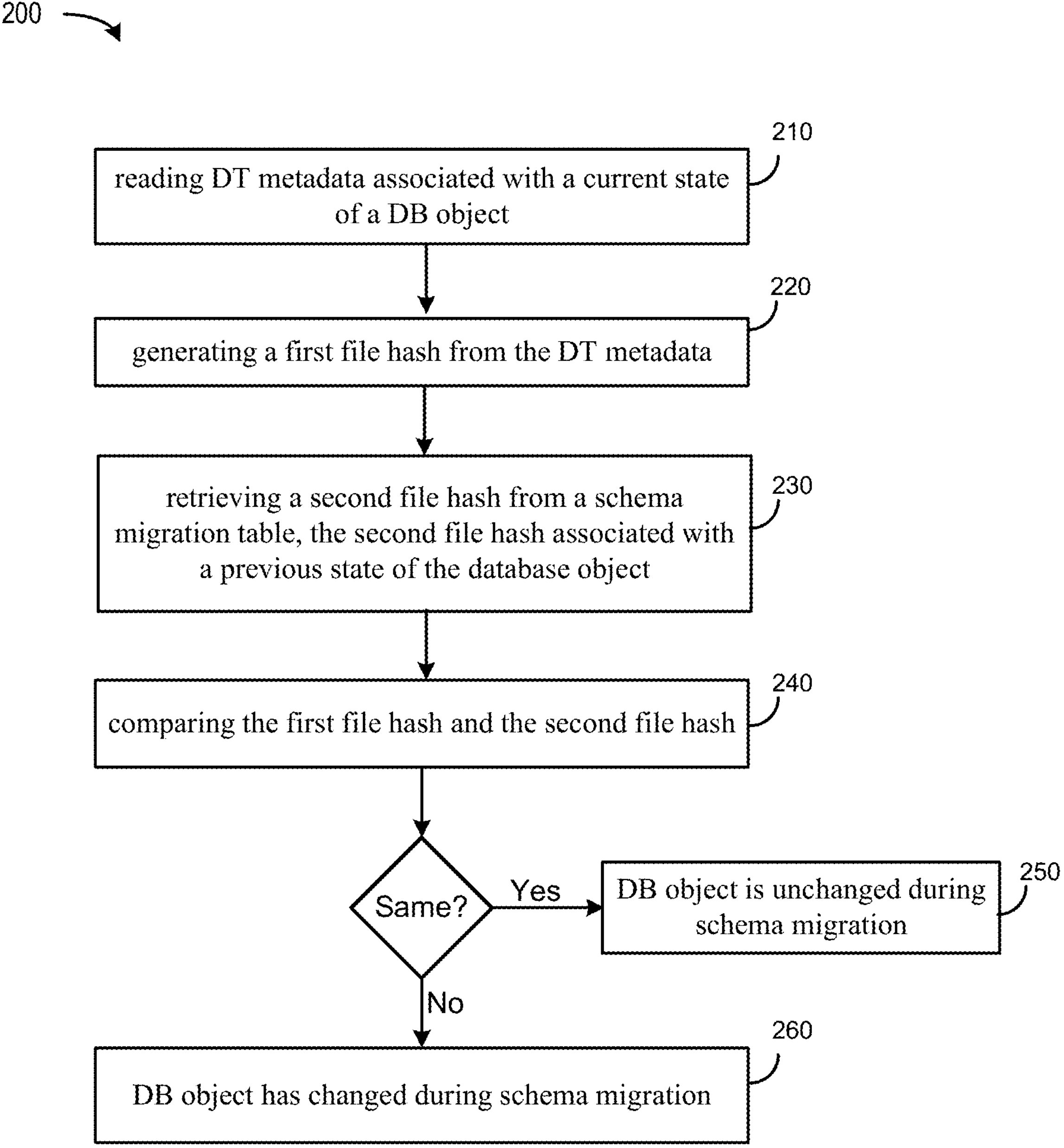
FIG. 2 illustrates a method for detecting whether a change has occurred within a database object according to some embodiments.
Figure 4:
FIG. 4 illustrates an exemplary .hdb file that contains DT metadata for multiple entities according to some embodiments.

FIG. 2 illustrates a method for detecting whether a change has occurred within a database object according to some embodiments. Method 200 may detect whether a change has occurred without querying the database. This may be advantageous, particularly in systems where querying the database is computationally expensive. Method 200 may be stored as instructions to be executed by schema migration processor 130 of FIG. 1*a* or 1*b*. Method 200 starts by reading DT metadata at 210. In one example, DT metadata may describe a single database object. In another example, DT metadata may describe multiple database objects. FIG. 4 is one example where DT metadata describes multiple database objects known as entities.

Method 200 then continues by generating a first file hash from the DT metadata at 220. In one example, a hash algorithm such as SHA-256 can be applied to DT metadata to generate the first file hash. In other examples, other algorithms, including other hash algorithms, can be utilized to generate the first file hash from DT metadata. Once the first file hash has been generated, method 200 continues by retrieving a second file hash from a schema migration table at 230. The second file hash is associated with an earlier version or a previous state of DT metadata. In one embodiment, the second file hash may have been generated during a prior schema migration. For instance, the second file hash may have been generated by hashing an earlier version of DT metadata when DT metadata described a previous state of the database object. For example, a database object may originally be a table that has 2 columns. Thus, its original state is a table with two columns. During a first schema migration, an additional column is added to the table bringing the total number of columns to three. Thus, its second state is a table with three columns. During a second schema migration, an additional column is added to the table bringing the total number of columns to four. Thus, its third state is a table with four columns. It's possible for different states to have the same table in some embodiments.

At 240, method 200 continues by comparing the first file hash and the second file hash. The comparison can determine whether the two values match (i.e., are equal or are the same). If the values are the same, then method 200 determines that the database object is unchanged during the schema migration at 250. Alternatively, if the values are not the same, then method 200 determines that the database object has changed during the schema migration at 260. In some embodiments when the database object has changed during the schema migration, additional steps may be performed to identify what the change is and to propagate the change from design time environment to runtime environment.

Figure 3:
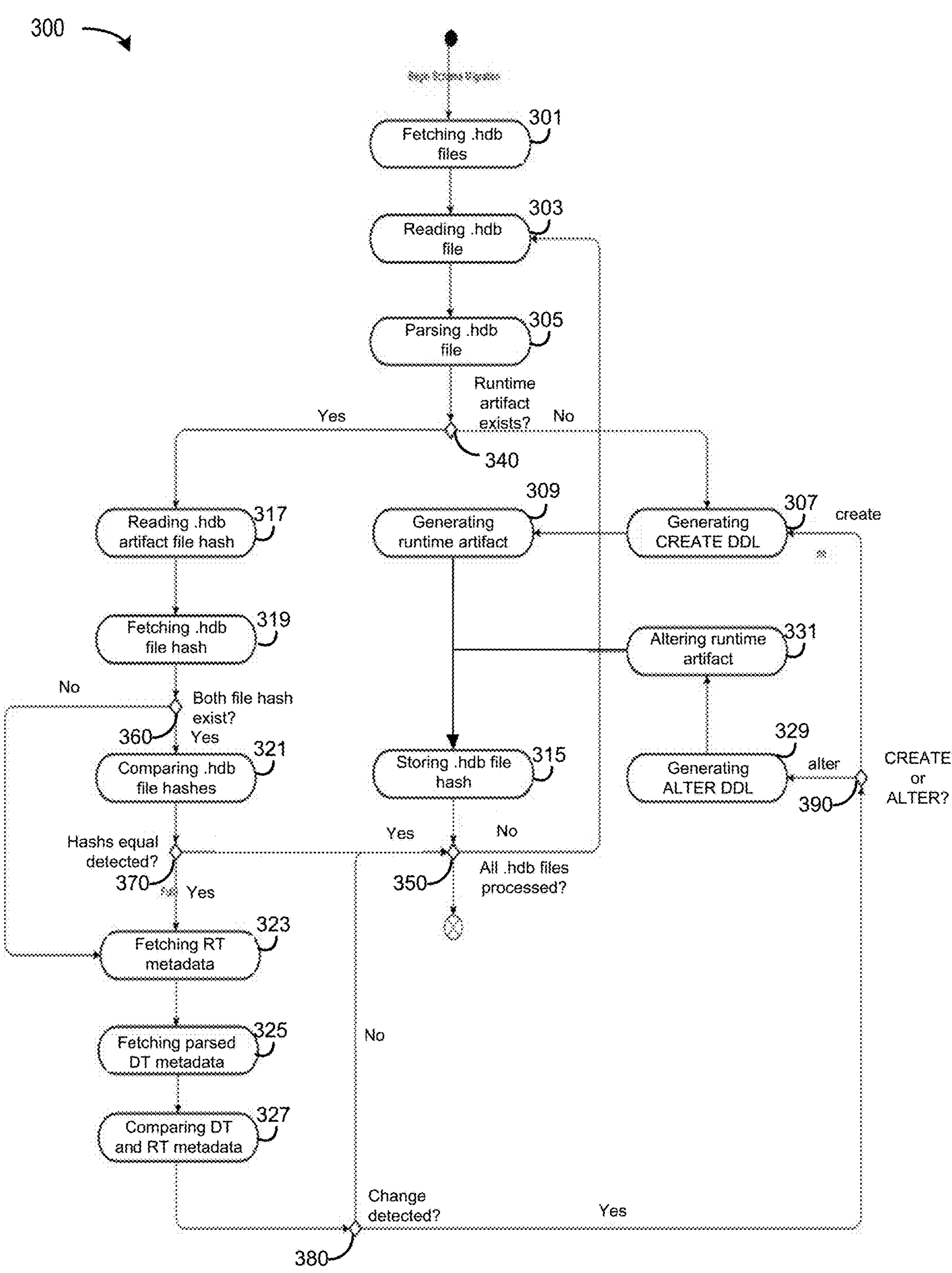
FIG. 3 illustrates a method for performing a schema migration according to some embodiments.

FIG. 3 illustrates a method for performing a schema migration according to some embodiments. Method 300 may be performed by a schema migration processor. In one embodiment, the schema migration may be initiated manually by a developer. In another embodiment, the schema migration may be initiated automatically whenever an update to an application is deployed or whenever a new version of an application is available. Method 300 begins by fetching the .hdb files (i.e., DB files) at 301. A database may have multiple .hdb files. Each .hdb file contains DT metadata that describes database objects in the database in a format that is understood by the migration processor. The DT metadata can include design time artifacts, where each design time artifact describes a database object in the design time environment. FIG. 4 illustrates one example of a .hdb file. The DT metadata can be processed and concerted into DLL for execution on the database.

Method 300 continues by reading the first .hdb file at 303 and parsing the .hdb file at 305. Parsing the .hdb file allows the contents of the first .hdb file to be interpreted. Here, the .hdb file is parsed to determine a design time artifact describing a database object. Once the .hdb file has been parsed, method 300 may determine if a runtime artifact associated with the database object exists at 340. Each runtime artifact describes a database object in the runtime environment. In one embodiment, method 300 may determine whether a runtime artifact exists by determining whether a hash exists for the database object. In one example, method 300 may query schema migration table for a file hash associated with the database object. If a file hash exists, then a runtime artifact exists. If a file hash does not exist, then an error may have occurred because the design time object exists but the runtime artifact does not exist. If the runtime artifact does not exist, then method 300 continues by generating CREATE DDL statement at 307 and then generating a runtime artifact by executing the CREATE DDL statement at 309. The generated runtime artifact is created in a database as a table for example, using DDL. Once the runtime artifact is generated, method 300 continues by storing the file hash into the schema migration table at 315. The file hash serves as a signature of the current state of the database object associated with the file hash. At 350, method 300 checks whether all .hdb files have been processed. If they all have been processed, the method ends. However, if there are additional .hdb files that have not been processed, then method 300 returns to 303 to read the next .hdb file.

At 340 if a runtime artifact does exist, then method 300 can compare the file hashes to detect whether a change has occurred. Method 300 can continue by reading a .hdb artifact file hash from the schema migration table at 317. The .hdb artifact file hash can be associated with the database object. The .hdb artifact file hash is a file hash associated with the .hdb file that was previously generated with a hash algorithm and stored in the schema migration table as a snapshot of the database object at an earlier point in time. The .hdb artifact file hash read may be the most recent file hash in schema migration table that is associated with the .hdb file. In one embodiment, method 300 may read .hdb file hash from the schema migration table by querying for entries associated with the .hdb file. In instances where there are multiple entries associated with the .hdb file, the most recent entry is selected. Selection may be based on the last update time stamp parameter.

After the first file hash has been read, method 300 can continue by reading a second file hash by fetching .hdb file hash at step 319. The .hdb file hash may be a file hash generated from the .hdb file parsed in step 305. In one embodiment, method 300 can generate .hdb file hash by hashing the .hdb file with a hashing algorithm. The same hashing algorithm may also be applied each time a .hdb file is processed during schema migration. In some examples, the .hdb file hash can be generated from the .hdb file when the .hdb file is parsed in step 305 and stored in memory to be fetched in step 319. In other examples, the .hdb file hash may be generated at step 319 by executing a hashing algorithm on the .hdb file parsed in step 305.

Method 300 continues by determining whether both file hashes exist at 360. Both file hashes may not exist if the database object was never created before in the runtime environment. This may occur when a new database object is being introduced for the first time in the design time environment because the new database object would not have an associated file hash stored in the schema migration table. If an associated file hash does not exist in the schema migration table, then method 300 continues with a full comparison by fetching runtime metadata from the database at 323. In one embodiment, this may include a query to the database for RT metadata. Method 300 then continues by fetching parsed design time metadata from the parsed .hdb file at 323. The design time metadata may be fetched at step 325. In some examples, the design time metadata is fetched from the file system of the application running on NodeJS. The application is deployed as a NodeJS application and everything is on the file system. Method 300 then continues by comparing the DT metadata and the RT metadata to identify differences at step 327. In one embodiment, the DT metadata may be the source of truth, meaning that the RT metadata is compared to the DT metadata. For example, if a table in the DT metadata includes two columns but the table in the RT metadata includes 3 columns, the two-column table is considered the source of truth even though it has fewer columns.

After the comparison, method 300 checks whether a change has been detected at 380. If there are no differences in the DT metadata and the RT metadata, no change has been detected and therefore the design time and runtime artifacts are aligned which means the processing of this .hdb file is complete. Method 300 then checks whether all .hdb files have been processed at 350 and will continue processing .hdb files that have yet to be processed. If there are differences between the DT metadata and the RT metadata, one or more changes have been detected and method 300 continues by determining whether to create a new runtime artifact or alter an existing runtime artifact at 390. This determination may depend on whether a runtime artifact currently exists. If no runtime artifact exists, then method 300 continues by creating anew runtime artifact by generating CREATE DDL statement at 307, followed by generating runtime artifact at 309. If a runtime artifact already exists, method 300 may alter the runtime artifact by generating ALTER DDL at 329 and altering the runtime artifact by executing the ATLER DDL statement at 331. After method 300 has created a new runtime artifact or altered an existing runtime artifact, method 300 continues by storing the generated .hdb file hash to the schema migration table at step 315. The generated .hdb file hash may be generated from the .hdb file parsed in step 305. Schema migration table may store the generated .hdb file hash along with additional fields such as the file path of the .hdb file, the version of the application, and/or a time stamp of the last time the .hdb file was updated.

FIG. 4 illustrates an exemplary .hdb file that contains DT metadata for multiple entities according to some embodiments. As shown, DT metadata 400 includes entity 410, entity 420, and entity 430. Each entity may describe a database object. The file hash generated from the .hdb file will be a hash of all contents in the .hdb file. In some embodiments, it may be advantageous for DT metadata to include multiple database objects because schema migration processor can determine that all of the database objects described in DT metadata are unchanged when the file hash associated with DT metadata equals the if the file hash generated from the DT metadata is equal to the file hash stored in the schema migration table, then it can be concluded that the multiple database objects described within DT metadata have not changed during the present schema migration. However, if the hashes are not equal, then it can be concluded that at least one of the multiple database objects within the DT metadata have changed and each database object may require analysis to detect which ones have changed.

Figure 5:
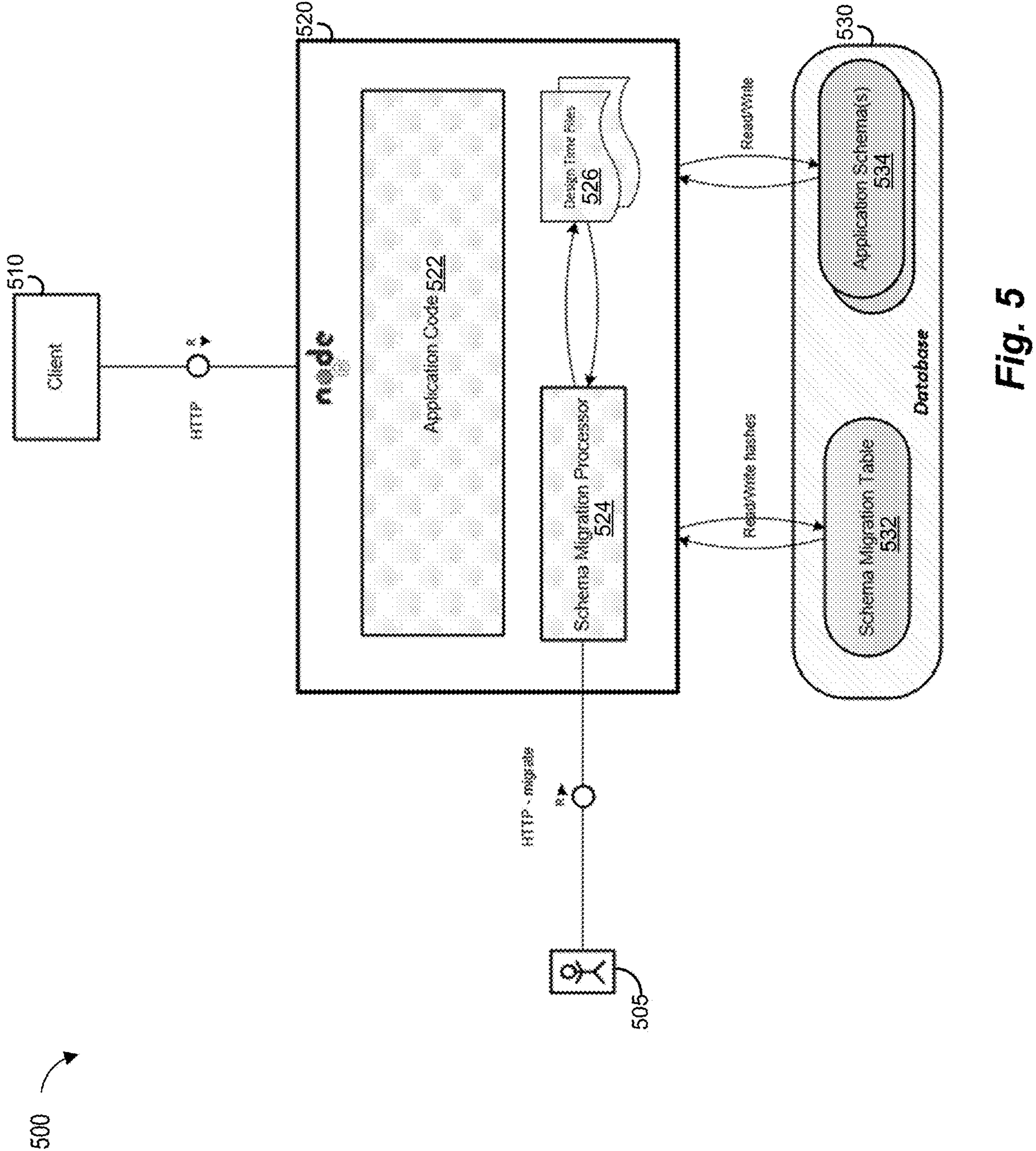
FIG. 5 illustrates a system level diagram according to some embodiments.

FIG. 5 illustrates a system level diagram according to some embodiments. System 500 includes developer 505, client 510, NodeJS environment 520, and database 530. Developer 505 may be developing the application running on NodeJS environment 520 and client 510 may be accessing the application. The application may access database 530. NodeJS environment 520 includes application code 522, schema migration processor 524, and design time files 526. Database 530 can include schema migration table 532 and application schemas 534. Schema migration processor 524 may read/write file hashes to schema migration table 532 and also read/write application schemas to application schemas 534 during the schema migration process. For example, schema migration processor 524 may generate a file hash from a design time file and store the file hash within schema migration table 532. Schema migration processor 524 may also compare the DT metadata and RT metadata to identify the changes to the schema, update the application schema, and store the updated application schema in application schemas 534.

Figure 6:
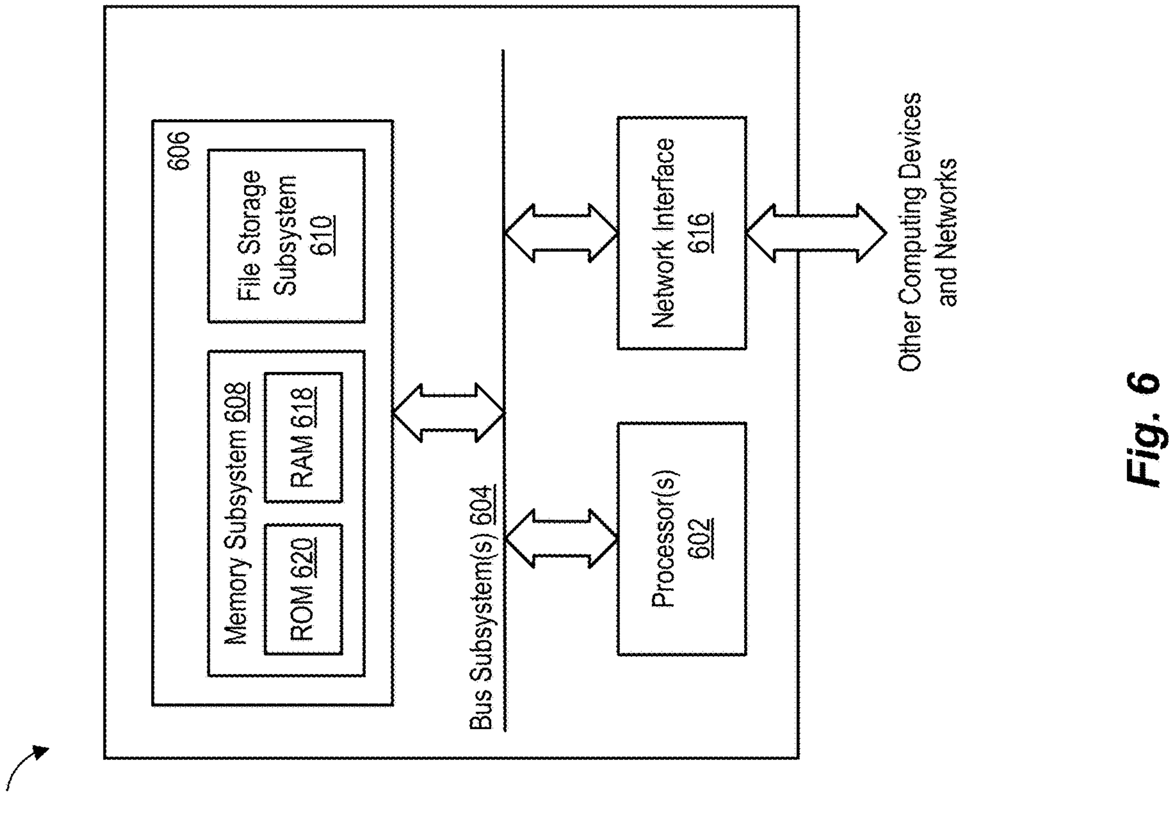
FIG. 6 depicts a simplified block diagram of an example computer system 600, which can be used to implement some of the techniques described in the foregoing disclosure.

FIG. 6 depicts a simplified block diagram of an example computer system 600, which can be used to implement some of the techniques described in the foregoing disclosure. As shown in FIG. 6, system 600 includes one or more processors 602 that communicate with several devices via one or more bus subsystems 604. These devices may include a storage subsystem 606 (e.g., comprising a memory subsystem 608 and a file storage subsystem 610) and a network interface subsystem 616. Some systems may further include user interface input devices and/or user interface output devices (not shown).

Bus subsystem 604 can provide a mechanism for letting the various components and subsystems of system 600 communicate with each other as intended. Although bus subsystem 604 is shown schematically as a single bus, alternative embodiments of the bus subsystem can utilize multiple busses.

Network interface subsystem 616 can serve as an interface for communicating data between system 600 and other computer systems or networks. Embodiments of network interface subsystem 616 can include, e.g., Ethernet, a Wi-Fi and/or cellular adapter, a modem (telephone, satellite, cable, etc.), and/or the like.

Storage subsystem 606 includes a memory subsystem 608 and a file/disk storage subsystem 610. Subsystems 608 and 610 as well as other memories described herein are examples of non-transitory computer-readable storage media that can store executable program code and/or data that provide the functionality of embodiments of the present disclosure.

Memory subsystem 608 comprise one or more memories including a main random access memory (RAM) 618 for storage of instructions and data during program execution and a read-only memory (ROM) 620 in which fixed instructions are stored. File storage subsystem 610 can provide persistent (e.g., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that system 600 is illustrative and many other configurations having more or fewer components than system 600 are possible.

The above description illustrates various embodiments of the present invention along with examples of how aspects of the present invention may be implemented. The above examples and embodiments should not be deemed to be the only embodiments and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

FURTHER EXAMPLES

Each of the following non-limiting features in the following examples may stand on its own or may be combined in various permutations or combinations with one or more of the other features in the examples below. In various embodiments, the present disclosure may be implemented as a processor or method.

In some embodiments the present disclosure includes a method comprising detecting a request for a schema migration in a database, the database including a database object, reading a design time metadata associated with a current state of the database object, generating a first file hash from the design time metadata, retrieving a second file hash from a schema migration table, the second file hash associated with a previous state of the database object, comparing the first file hash and the second file hash, determining whether the database object has changed during the schema migration by comparing the first file hash with the second file hash; and upon determining that the database object has changed during the schema migration, further performing the steps: querying the database for a runtime metadata associated with the database object, comparing the runtime metadata and the design time metadata, altering the database object in the database based on the comparison; and writing the first file hash into the schema migration table.

In one embodiment, the database object has changed when the first file hash is different than the second file hash.

In one embodiment, the schema migration table stores at least one of following along with the second file hash: a file path of the database object, a version number of the database object, a version number of an application accessing the database; and a last update time of the second file hash.

In one embodiment, altering the database object includes adding a column to a database table representing the database object during runtime.

In one embodiment, altering the database object includes generating a DDL statement containing instructions to add the column to the database table.

In one embodiment, the design time metadata is associated with a current state of a second database object, the method further comprising determining the second database object is unchanged during the schema migration when the first file hash equals the second file hash.

In one embodiment, the first file hash is based on SHA-256 hashing algorithm.

In one embodiment, the design time metadata is considered the ground truth when comparing the runtime metadata and the design time metadata.

In some embodiments, the present disclosure includes a system for database schema migration comprising one or more processors, a non-transitory computer-readable medium storing a program executable by the one or more processors, the program comprising sets of instructions for: detecting a request for a schema migration in a database, the database including a database object, reading a design time metadata associated with a current state of the database object, generating a first file hash from the design time metadata, retrieving a second file hash from a schema migration table, the second file hash associated with a previous state of the database object, comparing the first file hash and the second file hash, determining whether the database object has changed during the schema migration by comparing the first file hash with the second file hash and upon determining that the database object has changed during the schema migration, further performing the steps: querying the database for a runtime metadata associated with the database object, comparing the runtime metadata and the design time metadata, altering the database object in the database based on the comparison, and writing the first file hash into the schema migration table.

In some embodiments, the present disclosure includes a non-transitory computer-readable medium storing a program executable by one or more processors, the program comprising sets of instructions for: detecting a request for a schema migration in a database, the database including a database object, reading a design time metadata associated with a current state of the database object, generating a first file hash from the design time metadata, retrieving a second file hash from a schema migration table, the second file hash associated with a previous state of the database object, comparing the first file hash and the second file hash, determining whether the database object has changed during the schema migration by comparing the first file hash with the second file hash and upon determining that the database object has changed during the schema migration, further performing the steps: querying the database for a runtime metadata associated with the database object, comparing the runtime metadata and the design time metadata, altering the database object in the database based on the comparison, and writing the first file hash into the schema migration table.

What is claimed is:

1. A method comprising:

detecting a request for a schema migration in a database, the database including a database object;

reading a design time metadata associated with a current state of the database object, the design time metadata comprising a design time specification that describes the database object and other database objects in the database, wherein the schema migration is performed by updating the design time specification in a design time environment and generating the database object and the other database objects during runtime based on the updated design time specification;

generating a first file hash from the design time metadata;

retrieving a second file hash from a schema migration table, the second file hash associated with a previous state of the database object;

comparing the first file hash and the second file hash;

if the first file hash and the second file hash do not match, determining that the database object has changed during the schema migration;

upon determining that the database object has changed during the schema migration, further performing steps a through d in a sequence:

(a) querying the database for a runtime metadata associated with the database object;

(b) comparing the runtime metadata and the design time metadata;

(c) altering the database object in the database based on the comparison; and (d) writing the first file hash into the schema migration table;

if the first file hash and the second file hash do match, determining that the database object has not changed during the schema migration; and upon determining that the database object has not changed during the schema migration, bypassing at least steps a, b, and c in the sequence.

2. The method as in claim 1, wherein the database object has changed when the first file hash is different than the second file hash.

3. A method as in claim 1, wherein the schema migration table stores at least one of following along with the second file hash: a file path of the database object, a version number of the database object, a version number of an application accessing the database; and a last update time of the second file hash.

4. A method as in claim 1, wherein altering the database object includes adding a column to a database table representing the database object during runtime.

5. A method as in claim 4 wherein altering the database object includes generating a DDL statement containing instructions to add the column to the database table.

6. A method as in claim 1 wherein the design time metadata is associated with a current state of a second database object, the method further comprising determining the second database object is unchanged during the schema migration when the first file hash equals the second file hash.

7. A method as in claim 1 wherein the first file hash is based on SHA-256 hashing algorithm.

8. A method as in claim 1 wherein the design time metadata is considered the ground truth when comparing the runtime metadata and the design time metadata, and wherein the database object is altered by modifying the runtime metadata to match the design time metadata.

9. The method of claim 1, wherein the second file hash is a most recent file hash stored in the schema migration table that is associated with the design time metadata.

10. The method of claim 1, wherein altering the database object in the database based on the comparison comprises at least one of:

identifying a difference between the runtime metadata and the design metadata;

identifying a change to an application schema; or updating the application schema.

11. The method of claim 1, wherein writing the first file hash into the schema migration table comprises updating parameters associated with the first file hash.

12. The method of claim 1, wherein writing the first file hash into the schema migration table comprises storing the first file hash within the schema migration table without updating parameters associated with the first file hash.

13. A system for database schema migration comprising:

one or more processors;

a non-transitory computer-readable medium storing a program executable by the one or more processors, the program comprising sets of instructions for:

detecting a request for a schema migration in a database, the database including a database object;

reading a design time metadata associated with a current state of the database object, the design time metadata comprising a design time specification that describes the database object and other database objects in the database, wherein the schema migration is performed by updating the design time specification in a design time environment and generating the database object and the other database objects during runtime based on the updated design time specification;

generating a first file hash from the design time metadata;

retrieving a second file hash from a schema migration table, the second file hash associated with a previous state of the database object;

comparing the first file hash and the second file hash;

if the first file hash and the second file hash do not match, determining that the database object has changed during the schema migration;

upon determining that the database object has changed during the schema migration, further performing steps a through d in a sequence:

(a) querying the database for a runtime metadata associated with the database object;

(b) comparing the runtime metadata and the design time metadata;

(c) altering the database object in the database based on the comparison; and (d) writing the first file hash into the schema migration table;

if the first file hash and the second file hash do match, determining that the database object has not changed during the schema migration; and upon determining that the database object has not changed during the schema migration, bypassing at least steps a, b, and c in the sequence.

14. The system of claim 13, wherein the database object has changed when the first file hash is different than the second file.

15. The system of claim 13, wherein the schema migration table stores at least one of following along with the second file hash: a file path of the database object, a version number of the database object, a version number of an application accessing the database; and a last update time of the second file hash.

16. The system of claim 13, wherein altering the database object includes adding a column to a database table representing the database object during runtime.

17. The system of claim 16, wherein altering the database object includes generating a DDL statement containing instructions to add the column to the database table.

18. The system of claim 13, wherein the design time metadata is associated with a current state of a second database object, the method further comprising determining the second database object is unchanged during the schema migration when the first file hash equals the second file hash.

19. A method as in claim 13, wherein the design time metadata is considered the ground truth when comparing the runtime metadata and the design time metadata.

20. A non-transitory computer-readable medium storing a program executable by one or more processors, the program comprising sets of instructions for:

detecting a request for a schema migration in a database, the database including a database object;

reading a design time metadata associated with a current state of the database object, the design time metadata comprising a design time specification that describes the database object and other database objects in the database, wherein the schema migration is performed by updating the design time specification in a design time environment and generating the database object and the other database objects during runtime based on the updated design time specification;

generating a first file hash from the design time metadata;

retrieving a second file hash from a schema migration table, the second file hash associated with a previous state of the database object;

comparing the first file hash and the second file hash; and if the first file hash and the second file hash do not match, determining that the database object has changed during the schema migration;

upon determining that the database object has changed during the schema migration, further performing steps a through d in a sequence:

(a) querying the database for a runtime metadata associated with the database object;

(b) comparing the runtime metadata and the design time metadata;

(c) altering the database object in the database based on the comparison; and (d) writing the first file hash into the schema migration table;

if the first file hash and the second file hash do match, determining that the database object has not changed during the schema migration; and upon determining that the database object has not changed during the schema migration, bypassing at least steps a, b, and c in the sequence.

* * * * *